(12) United States Patent
Ellerman

(10) Patent No.: US 7,240,753 B2
(45) Date of Patent: Jul. 10, 2007

(54) VEHICLE HOOD ASSEMBLY

(75) Inventor: Michael D. Ellerman, Montpelier, OH (US)

(73) Assignee: CK Technologies, LLC, Montpelier, OH (US)

( * ) Notice: Subject to any disclaimer, the term of this patent is extended or adjusted under 35 U.S.C. 154(b) by 295 days.

(21) Appl. No.: 10/788,875

(22) Filed: Feb. 27, 2004

(65) Prior Publication Data

US 2005/0211484 A1 Sep. 29, 2005

(51) Int. Cl.
*B62D 25/10* (2006.01)
(52) U.S. Cl. .................................... 180/69.2
(58) Field of Classification Search ............... 180/69.2, 180/69.21, 69.24
See application file for complete search history.

(56) References Cited

U.S. PATENT DOCUMENTS

| | | | | |
|---|---|---|---|---|
| 2,207,366 A | * | 7/1940 | Anderson | 180/69.2 |
| 2,584,576 A | * | 2/1952 | Gould | 362/496 |
| 2,620,889 A | * | 12/1952 | McCormick | 180/69.2 |
| 2,793,705 A | * | 5/1957 | Garrity | 180/69.2 |
| 4,186,476 A | * | 2/1980 | Mair et al. | 29/407.1 |
| 4,359,120 A | * | 11/1982 | Schmidt et al. | 296/187.04 |
| 4,753,475 A | * | 6/1988 | Mochida | 296/192 |
| 5,557,829 A | * | 9/1996 | Schoen et al. | 16/375 |
| 6,938,715 B2 | * | 9/2005 | Hamada et al. | 180/274 |

* cited by examiner

*Primary Examiner*—Christopher P. Ellis
*Assistant Examiner*—Bridget Avery
(74) *Attorney, Agent, or Firm*—Warner Norcross & Judd LLP

(57) ABSTRACT

A vehicle hood assembly is provided with a pair of fender panels that attach to a central panel at a first attachment point and a second attachment point. The fender panel is L-shaped in cross-section between the first attachment point and the second attachment point such that it functions as an air management channel. The central panel and the fender panels are preferably injection molded parts. The present invention also includes a method for manufacturing a vehicle hood.

15 Claims, 5 Drawing Sheets

VEHICLE HOOD ASSEMBLY

BACKGROUND OF THE INVENTION

The present invention is related to vehicle hood assemblies, and more particularly to a structurally improved vehicle hood assembly.

Vehicle hood assemblies, especially those for trucks and other heavy duty vehicles, are generally comprised of sheet molding compound ("SMC"). These hoods may be comprised of a single piece, but are often comprised of multiple pieces, such as separate fender panels attached to a central hood panel. For example, FIG. 1 shows a multiple panel hood 10 having a generally horizontal hood panel 12, and a pair of fender panels 14 attached on either side of the hood panel 12.

As shown in FIG. 2, fender panels 140 are commonly attached to the hood panel 120 with a small overlap 130 (approximately 2") and a conventional bond, such as a two part adhesive. This conventional attachment provides an aesthetically pleasing seam 130 between the hood and the fender. Unfortunately, the conventional assembly is difficult to separate for replacement of a panel, and the bonding fixtures and adhesive can be expensive.

As shown in FIG. 5, it also is known to attach SMC pieces 150 to the underside of the hood to add structural stability to the hood and to define a channel for directing air to a plenum for intake air and/or HVAC air. The structural members and air channel are functional, but they add material and labor cost to the hood assembly.

Although these vehicle hoods are currently considered adequate by those skilled in the art, artisans continue to seek advancements in appearance, structure, and ease of manufacturing and serviceability.

SUMMARY OF THE INVENTION

The aforementioned problems are overcome by the present invention wherein a vehicle hood assembly is provided with a pair of fender panels that 1) provide increased structural support; 2) increase the ease of manufacture, and 3) provide integral air channels.

In a preferred embodiment, each fender panel attaches to the hood panel at a first attachment point and a second attachment point. Instead of the conventional small overlap at the attachment point, the fender panels of the present invention attach at a first point inwards of the lateral edge of the hood panel, and at a second point near the lateral edge of the hood panel. The multiple attachment points and resulting extra material in the fender panel between the attachment points increases the strength of the hood, and reduces the need for additional structural members.

In a more preferred embodiment, the fender panel is L-shaped in the section between the first attachment point and the second attachment point, forming a box shaped cross section between the hood panel and the fender panel. In another preferred embodiment, the L-shaped section of the fender panel is stepped in a number of locations. The steps further increase the structural strength of the vehicle hood. An additional result of this L-shaped section is that it forms a chamber between the fender panel and the hood panel that functions to channel outside air.

It is also preferable that the hood panel and the fender panels are injection molded plastic. The panels are separately molded into the desired shape, and then removably attached together at the attachment points. The use of plastic increases the ease of manufacture, and creates a much lighter vehicle hood, without reducing the structural integrity of the vehicle hood. The preferred attachment increases the ease of serviceability of a single panel.

The present invention also includes a method for manufacturing a vehicle hood, comprising the steps of: a) injection molding a hood panel that includes a central portion and lateral portions; b) injection molding a pair of fender panels, each fender panel having a first, L-shaped section adapted to attach to the hood panel and a second section extending from the first section; and then c) attaching the fender panels to opposing sides of the hood panel at a first location in the central portion, and a second location in the lateral portion, forming a chamber between the hood panel and the fender panel between the first and second attachment locations.

These and other objects, advantages, and features of the invention will be more fully understood and appreciated by reference to the detailed description of the preferred embodiment and the drawings.

DETAILED DESCRIPTION OF THE PREFERRED EMBODIMENT

Figure 1:
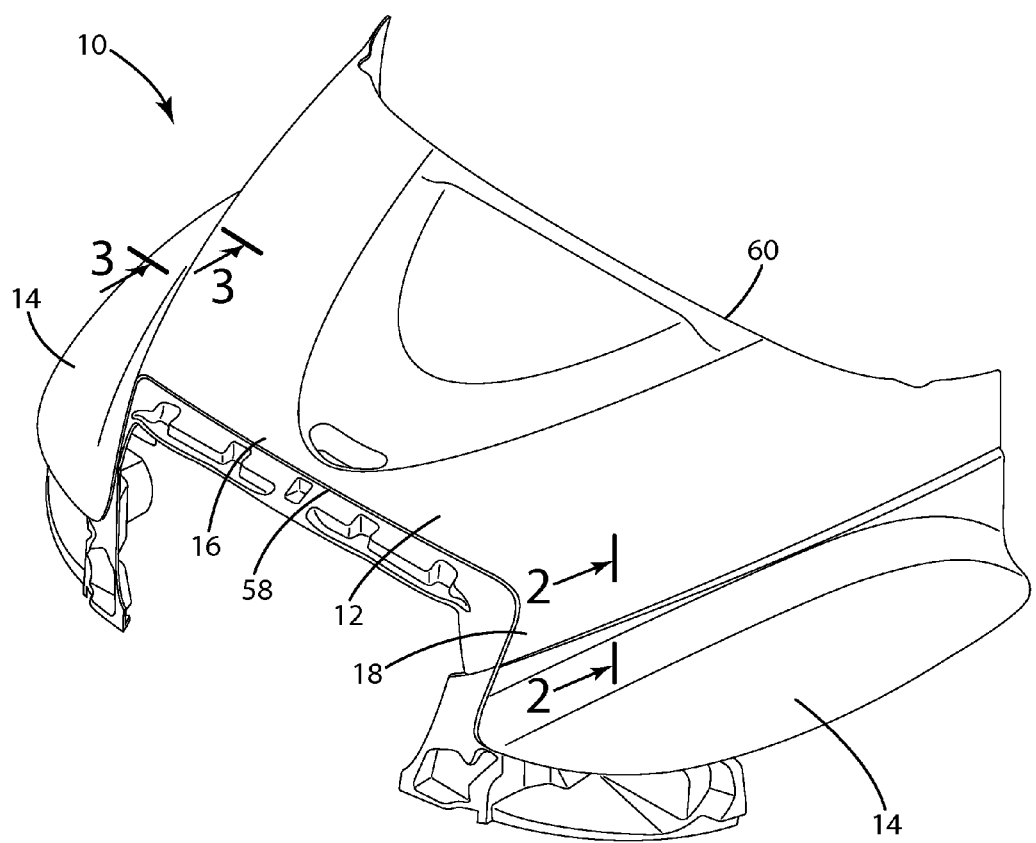
FIG. 1 is a perspective view of a truck hood.
Figure 2:
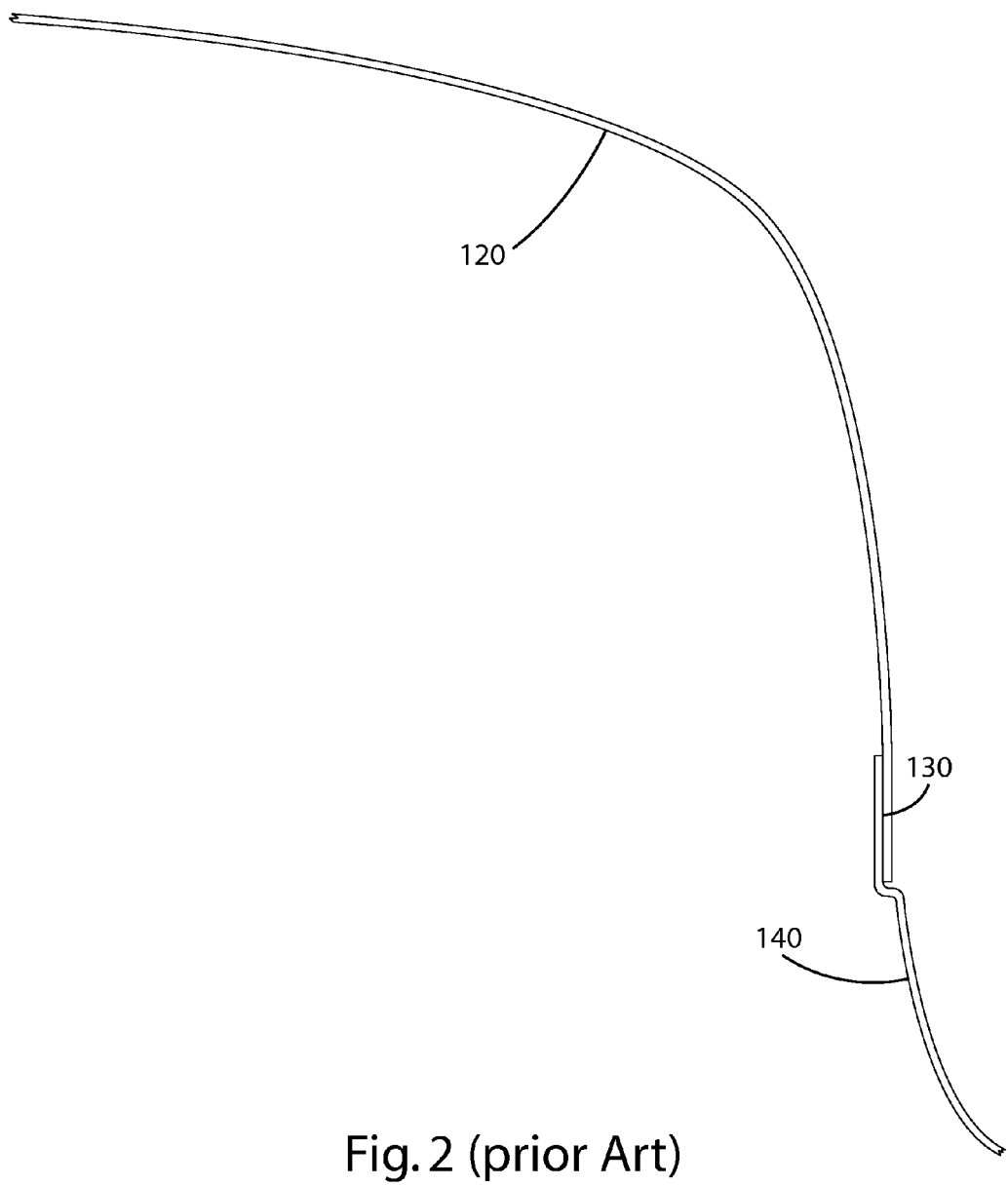
FIG. 2 is a sectional view of the prior art panel attachment taken along line 2-2 in FIG. 1.
Figure 3:
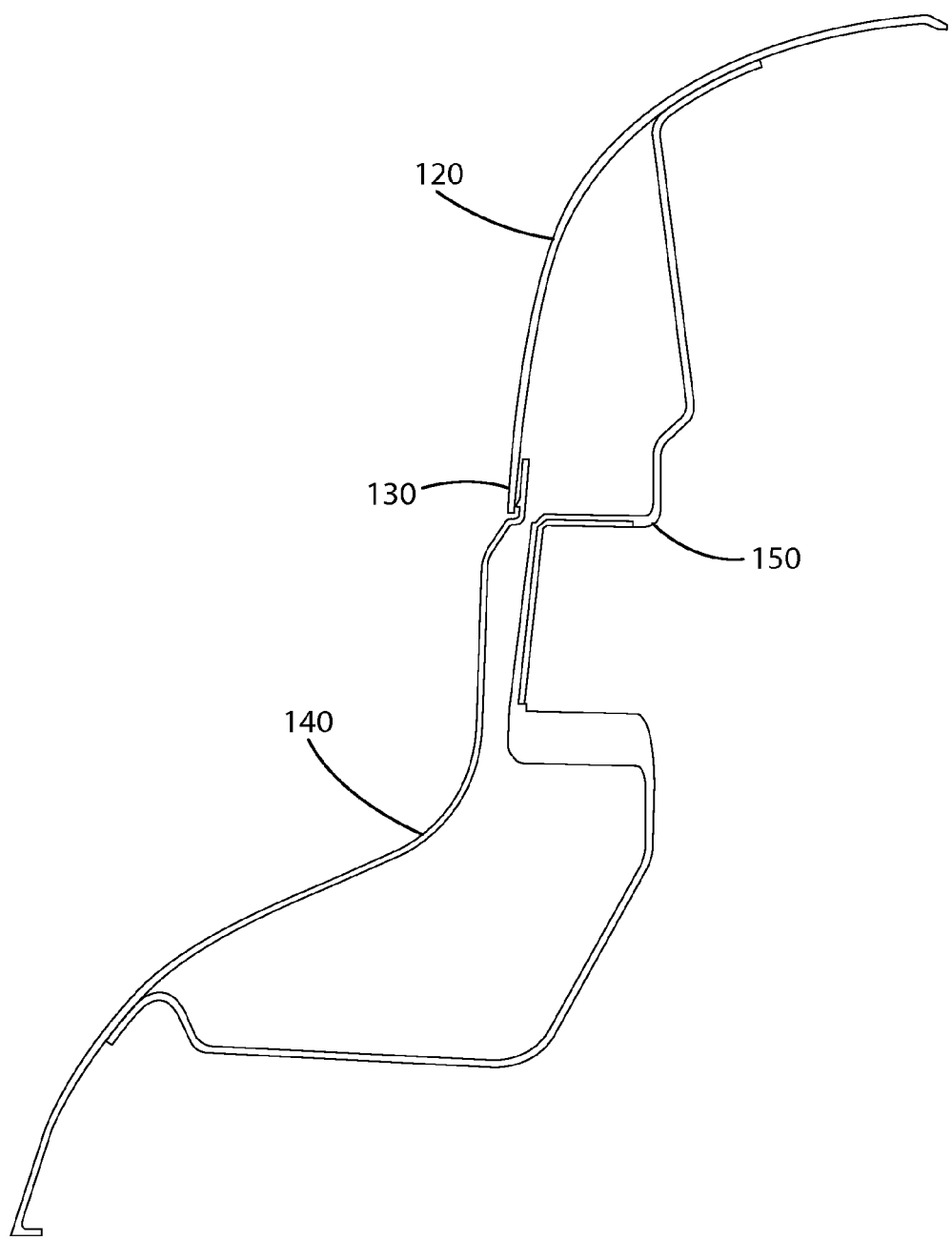
FIG. 3 is a sectional view of the prior art including a structural member taken along line 3-3 in FIG. 1.
Figure 4:
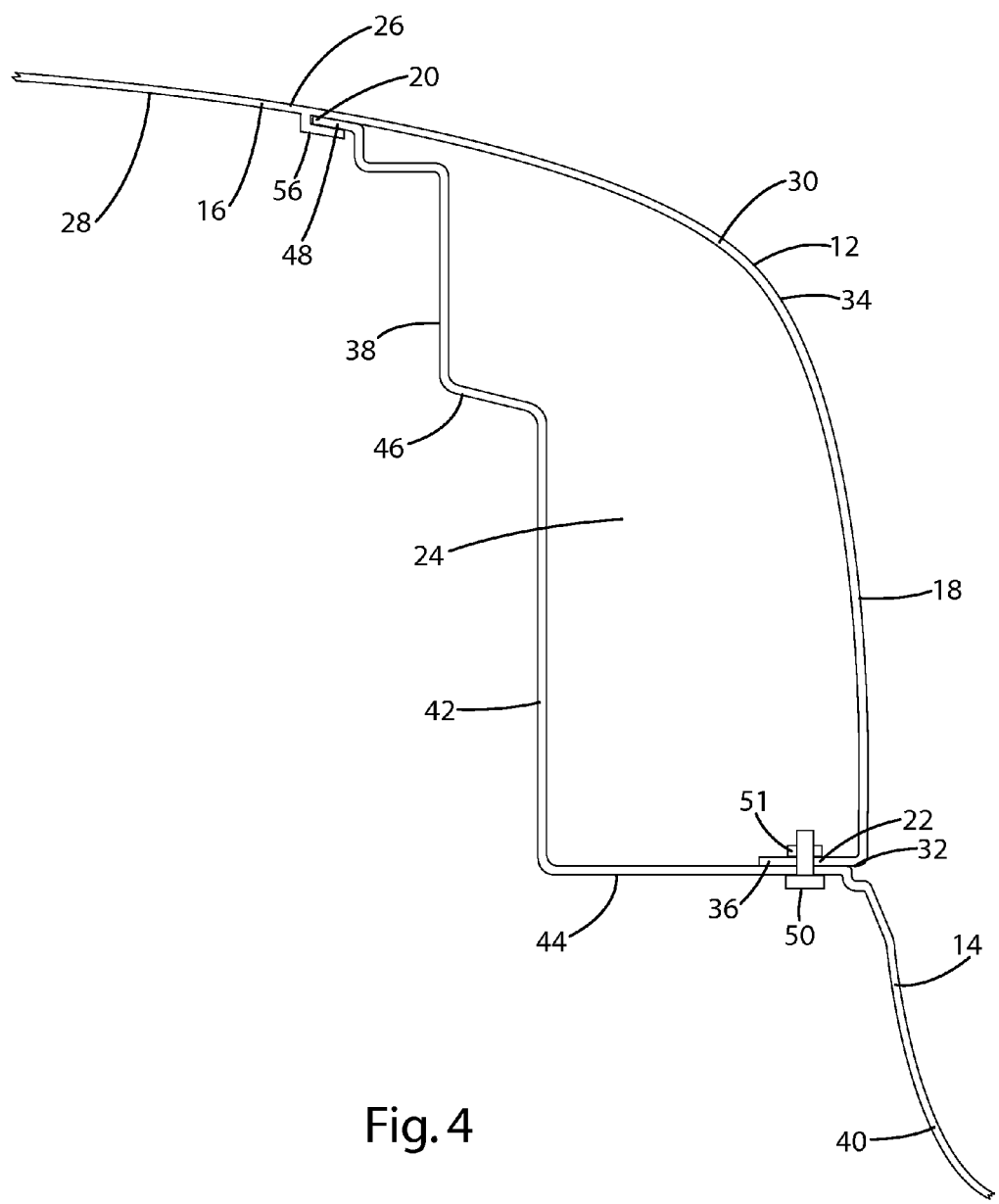
FIG. 4 is a sectional view of the preferred embodiment present invention taken along line 2-2 in FIG. 1.

A vehicle hood in accordance with the preferred embodiment of the present invention is shown in FIG. 1 and generally designated 10. The vehicle hood 10 includes an injection molded hood panel 12, and a pair of injection molded fender panels 14 on opposing sides of the hood panel 12. The hood panel 12 includes a central portion 16 and opposing lateral portions 18 that extend downwardly from the central portion 16. Referring now to FIG. 4, the fender panels 14 are each attached to the hood panel 12 at a first attachment location 20 in the central portion 16 and a second attachment location 22 in the lateral portion 18. A chamber 24 is formed between the hood panel 12 and the fender panels 14 between the first and second attachment locations 20, 22. The vehicle hood is manufactured by injection molding the hood panel 12 and the fender panels 18, and then attaching the fender panels 18 to opposing sides of the hood panel 12.

The hood panel 12 is preferably molded as a single part from an injection molding grade thermoplastic, and preferably includes a central portion 16 and opposing lateral portions 18. The central portion 16 is a generally horizontal panel formed to a size and shape that will cover the engine compartment of a desired vehicle having a front edge 50, and a rear edge 60 (see FIG. 1). The central portion 16 includes an upper surface 26 and a lower surface 28. Each surface 26, 28 may include a variety of aesthetic features, such as designs or indentations, and functional features, such as a handle or a grill attachment (see, for example, FIG. 1). The lateral portions 18 are preferably symmetrical, extending from opposing sides of the central portion 16 and including an inner surface 32 and an outer surface 34. The sectional view in FIG. 4 shows one half of this design, the other half preferably being a mirror image of the first. The lateral portions 18 preferably curve downward from the central portion 16 forming a corner 30. The corner 30 is preferably radiused, so that the outer surface 34 is smooth. The corner 30 preferably forms approximately a 90 degree angle, but the angle may vary depending on the desired shape of the hood 10. The lateral portions 18 each terminate in a lateral edge 32. In a preferred embodiment, the terminal portion of each lateral portion 18 corners inward to form a flange 36 for attachment to the fender panels 14.

The fender panels 14 are attached to opposing sides of the hood panel 12. Like the hood panel 12, the fender panels 14 are each preferably comprised of a thermoplastic that is injection molded to a desired shape. The fender panels 14 each include an attachment portion 38 and an exterior portion 40 molded as one piece. The attachment portion 38 is preferably L-shaped, including a first vertical member 42 and a second horizontal member 44. The vertical member 42 preferably includes one or more steps 46 for increasing the strength of the vertical member 42, and terminates in a flange 48 that extends at an angle from the vertical member 42.

Figure 5:
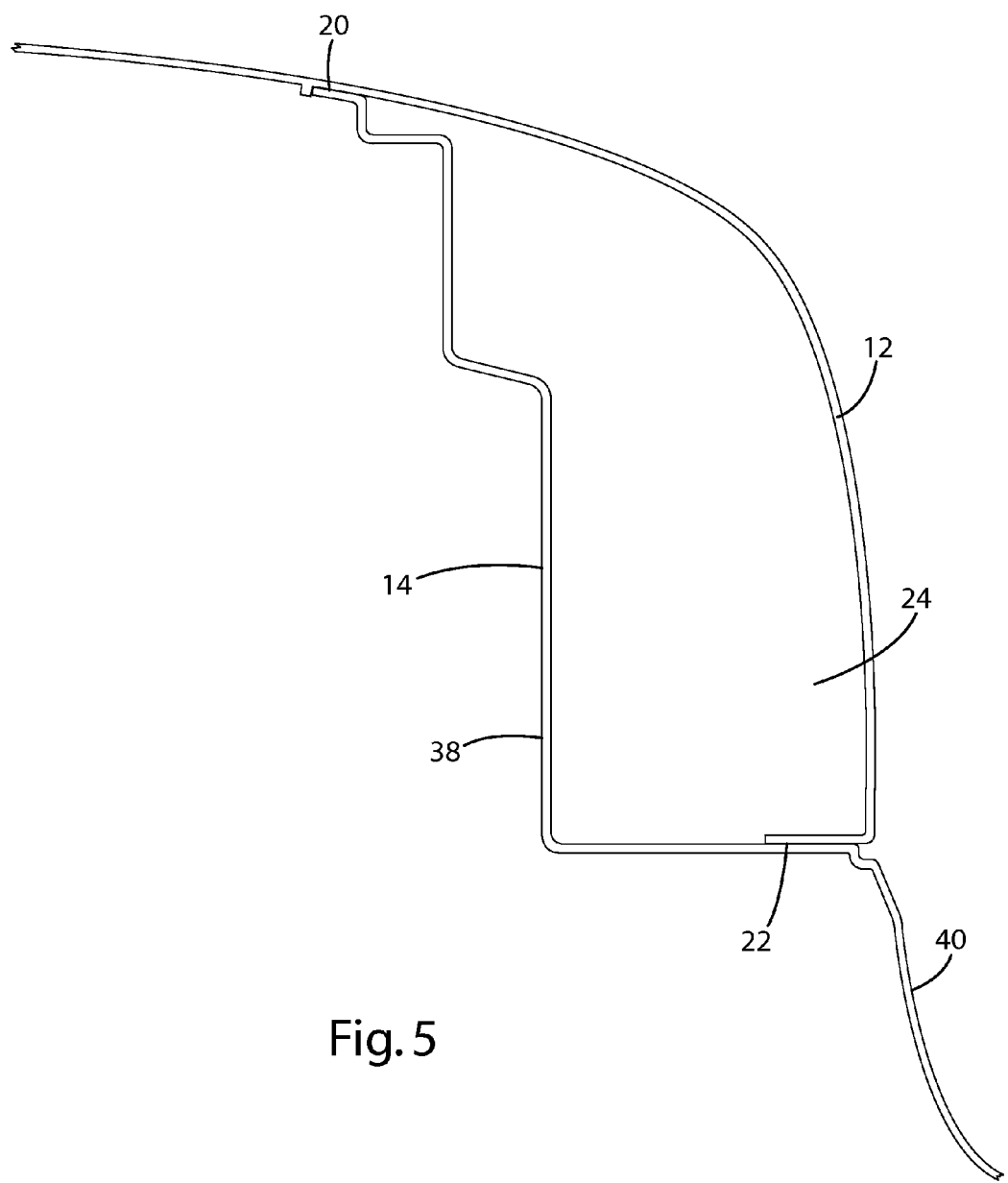
FIG. 5 is a sectional view of an alternative embodiment of the present invention taken along line 2-2 of FIG. 1.

The attachment portion 38 preferably attaches to the hood panel 12 in two locations. The first attachment location 20 is preferably between the flange 48 and the lower surface 28 of the hood panel central portion 16. This attachment 20, shown in FIG. 4, preferably includes a hook tab 56 for engaging the flange 48. The hook tab 56 preferably extends downwardly from the lower surface 28 of the hood panel 12, and runs substantially from the front 58 to the back 60 of the hood panel 12. In this preferred embodiment, the fender panel 14 is positioned so the flange 48 is fitted into the hook tab 56. The second attachment location 22 is preferably between the flange 36 and the horizontal member 44. This attachment preferably includes a conventional bolt 50 that extends through both the flange 36 and the horizontal member 44 into a nut 51. FIG. 5 shows an alternative embodiment, wherein the first 20 and second 22 attachments are formed with conventional bonding techniques.

When each fender panel 14 is attached to the hood panel 12, a box-like chamber 24 is formed between the L-shaped attachment portion 38 and the hood panel 12. The chamber 24 may function as an air management channel. The exterior portion 40 of the fender panel extends downward from the attachment portion 38, forming an exterior wall of the vehicle. The exterior portion 40 preferably forms at least a portion of a fender, but may be formed to any desired shape.

Manufacture of the preferred vehicle hood comprises the steps of a) injection molding a first thermoplastic into a hood panel, including a central portion and opposing lateral portions; b) injection molding a pair of symmetrical fender panels, each having an L-shaped attachment portion and an exterior portion; and c) attaching each of the fender panels to one of the opposing sides of the hood panel at a first location in the central portion of the hood panel and a second location in the lateral portion of the hood panel.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The invention claimed is:

1. A vehicle hood assembly comprising:
   a hood panel including a central portion and opposing lateral portions, each of said lateral portions having a lateral edge;
   a pair of fender panels, said fender panels each including an edge, said fender panels each attached to one of said opposing lateral portions of said hood panel such that said edge of said fender panel is fixedly secured to said central portion of said hood panel at a first attachment point, and said lateral edge of said hood panel is fixedly secured to said fender panel inward of said edge of said fender panel at a second attachment point, creating an enclosed chamber between said hood panel and said fender panel in between said first attachment point and said second attachment point.

2. The vehicle hood assembly of claim 1, wherein said fender panels are L-shaped between said first and second attachment points.

3. The vehicle hood assembly of claim 2, wherein said chamber between said L-shaped sections of said fender panels and said lateral portions of said hood panel forms an air channel.

4. The vehicle hood assembly of claim 3, wherein said chamber has a generally box-shaped cross section.

5. The vehicle hood assembly of claim 4, wherein said L-shaped section of said fender panel includes at least one step.

6. The vehicle hood assembly of claim 5, wherein said hood panel and said fender panels are plastic.

7. The vehicle hood assembly of claim 6, wherein at least one of said first and second attachment points comprises a flange engaging a hook tab.

8. The vehicle hood assembly of claim 6, wherein at least one of said first and second attachment points comprises a nut and bolt.

9. A vehicle hood assembly comprising:
   a thermoplastic hood panel including a central portion and a pair of opposing sidewalls extending downwardly from said central portion;
   a pair of thermoplastic fender panels extending downwardly from said opposing sidewalls, said fender panels each fixedly attached to said hood panel at a first attachment location in said central portion, and a second attachment location in said side wall, said hood panel and each of said fender panels defining an enclosed chamber between said first and second attachment locations.

10. The vehicle hood assembly of claim 9, wherein said fender panel includes at least one step between said first and second attachment locations.

11. The vehicle hood assembly of claim 9 wherein said sidewalls have an arcuate shape.

12. The vehicle hood assembly of claim 10, wherein said chamber has a generally box-shaped cross section.

13. The vehicle hood assembly of claim 12, wherein said fender panel is L-shaped between said first and second attachment locations.

14. The vehicle hood assembly of claim 13, wherein said chamber forms an air channel.

15. A method for manufacturing a vehicle hood comprising:
    injection molding a hood panel having a central portion and downwardly extending lateral portions;
    injection molding a pair of fender panels, each fender panel having a first, L-shaped section adapted to attach to said hood panel and a second section extending from said first section; and
    attaching said fender panels to opposing sides of said hood panel at a first location in said central portion, and a second location in said lateral portion, said fender panels fixedly secured to said hood panel at said first location and said second location, forming an enclosed chamber between said hood panel and said fender panel between said first and second locations.

* * * * *